Jan. 12, 1960  J. S. HOLLINGS  2,920,447
GAS TURBINE ENGINE WITH STARTING MEANS
Filed Nov. 21, 1955  4 Sheets-Sheet 1

Jan. 12, 1960     J. S. HOLLINGS     2,920,447
GAS TURBINE ENGINE WITH STARTING MEANS
Filed Nov. 21, 1955     4 Sheets-Sheet 4
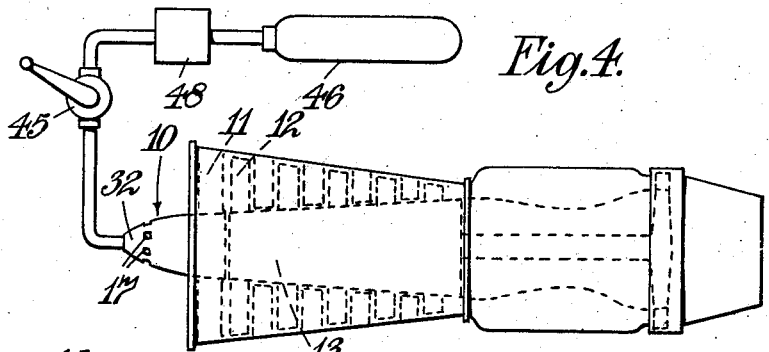
*Fig.4.*
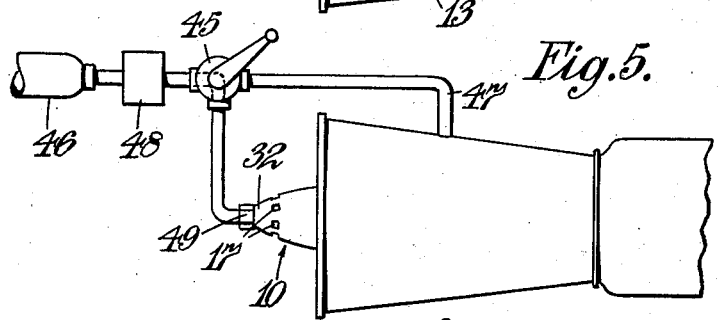
*Fig.5.*
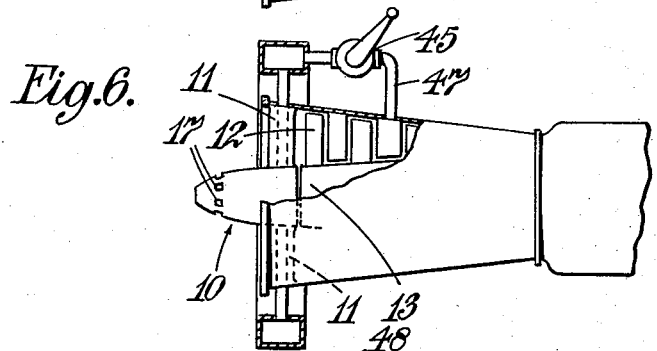
*Fig.6.*
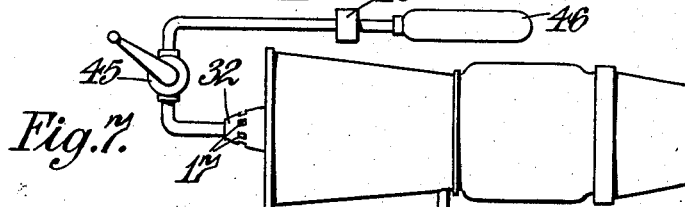
*Fig.7.*
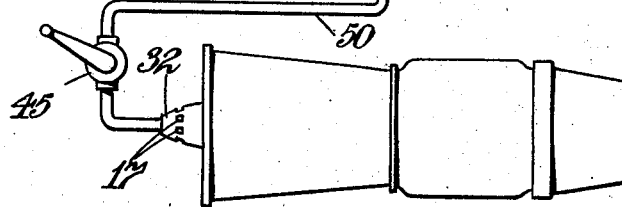
Inventor
J. S. Hollings
By: Mackinney + Mackinney
Attys.

2,920,447

GAS TURBINE ENGINE WITH STARTING MEANS

John Shaw Hollings, Derby, England, assignor to Rolls-Royce Limited, Derby, England, a British company Application November 21, 1955, Serial No. 548,222

Claims priority, application Great Britain December 3, 1954

1 Claim. (Cl. 60—39.14)

This invention relates to gas-turbine engines and is concerned more especially with starting such engines.

In prior United States patent application Serial No. 480,970 (Lombard and Davies), assigned to Rolls-Royce Limited, there is described and claimed a gas-turbine engine for a high-speed aircraft, in which sealing air is supplied from or internal components of the engine are cooled by ram-pressurised air fed to a duct internally of the engine. In one arrangement, the ram-pressurised air or engine-compressed air is delivered into the duct through a turbine wherein the air is expanded to cool it and which is connected to the engine rotor to assist to drive it; such an arrangement is suitable when the temperature of the ram-pressurised air is too high for cooling or sealing purposes.

This invention concerns gas-turbine engines having such an expansion turbine, and the invention broadly comprises utilising the turbine as a starter motor for the engine.

Accordingly, in one aspect, this invention comprises arranging that the expansion turbine is supplied with a pressure gas from a suitable source for starting purposes. The gas may be pressure air from a source externally of the engine, or the combustion products from a cartridge discharger.

Preferably the gas is fed from the turbine into the cooling or sealing air duct, and in this case when a cartridge discharger is used to supply the gas, precautions should be taken to avoid damage to engine parts.

Arrangements according to this invention will now be described with reference to the accompanying drawings in which:

Figures 4, 5, 6 and 7 show alternative general arrangements for supplying starting pressure gas.

Figure 1:
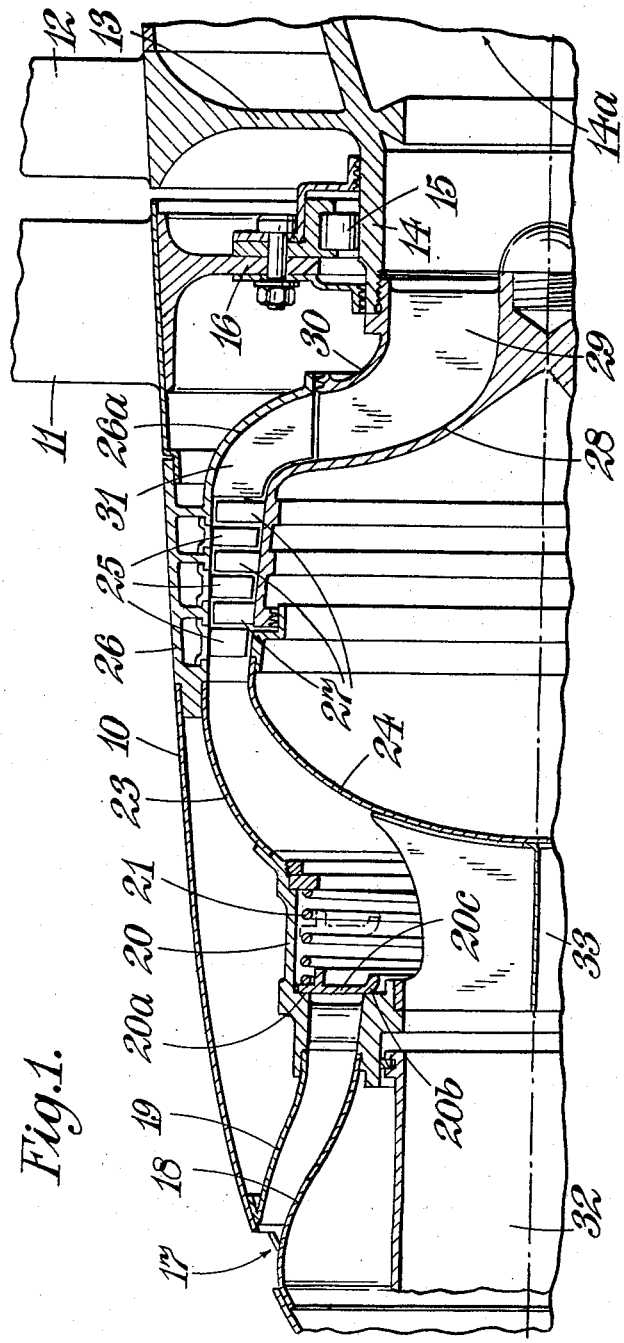
Figure 1 is an axial section through the compressor inlet fairing of a gas-turbine engine for high-speed aircraft.

Referring to Figure 1, the outer wall of the gas-turbine engine compressor intake bullet fairing is indicated at 10 and this wall, as will be well understood, provides the inner boundary of the air intake to the compressor. The fairing is supported from the external structure at least in part through struts or vanes 11 adjacent its downstream end. The first row of compressor rotor blades is indicated at 12.

The rotor blades are mounted at the periphery of a rotor structure 13 having a stub-shaft portion 14 at its inlet end mounted in a bearing 15 supported in a housing structure 16 accommodated within the fairing 10 and also supported by the struts or vanes 11.

The stub shaft 14 provides part of an air duct running through the engine by which cooling or sealing air is conveyed to internal components, and, in normal operation of the high-speed aircraft cooling or sealing air is fed into the duct passage 14a in the following way.

The fairing wall 10 has a number of slots 17 formed in it which lead to an annular passage formed within the bullet by a pair of coaxial walls 18 and 19. The annular passage leads to a valve structure 20 whereof the inlet is annular and is formed between a pair of annular seatings 20a and 20b. The inlet is controlled by an axially-displaceable annular valve member 20c which is loaded by a spring 21 into contact with the seatings 20a, 20b. The valve structure 20 is connected with an annular passageway formed between an outer wall member 23 and a domed member 24 both of which are supported within the fairing 10. This passageway leads to an expansion turbine having three axial-flow stages and an inward-radial-flow stage and whereof the stator comprises three rows of stator blades 25 mounted in a casing structure 26 forming part of the fairing wall, and whereof the rotor comprises rotor blades 27 alternating with the stator blades 15 and carried by a bell-shaped member 28, the narrower end of which is rounded and projects into the stub shaft 14. The bell-shaped member 28 is connected by vanes 29 to a flared outer shroud member 30 threaded into the end of the stub shaft 14 and the passages between the vanes 29 lead to the duct 14a. The air leaving the third-stage rotor blades 27 of the axial-flow section of the expansion turbine flows to the vanes 29 through an inwardly-curved passageway formed between part of the bell-shaped member 28 and an inturned flange 26a on the stator casing 26 of the axial-flow section of the turbine, and is given a tangential component by guide vanes 31 carried on flange 26a, which direct the air onto the vanes 29.

It will be appreciated that when the aircraft in which the engine is fitted is flying at high speed, ram-pressurised air enters the passage between the parts 18, 19, lifts the valve member 20c off its seatings 20a, 20b and flows into the turbine where the ram-pressurised air is expanded and so cooled. Also since the turbine rotor 27, 28, 29, 30 is connected with the stub shaft 14 which forms part of the engine rotor assembly, the expansion turbine assists to drive the engine.

Means is provided to enable the expansion turbine to be utilised as an engine starter motor, and this means comprises a pressure gas supply duct 32 accommodated within the nose of the bullet fairing 10 and arranged to deliver the pressure gas past vanes 33 into the passage between the wall 23 and the domed member 24 which, as will be seen, is supported from the valve structure 20 through the vanes 33. The valve member 20c prevents loss of the pressure gas through the ram air intake slots 17.

The pressure gas may be either pressure air or other gas from a source outside the engine or may, for example, be the combustion products from a cartridge starter as described below although in this case precaution will be necessary to ensure that the combustion products do not have an injurious effect upon the internal structure of the engine.

Figure 2:
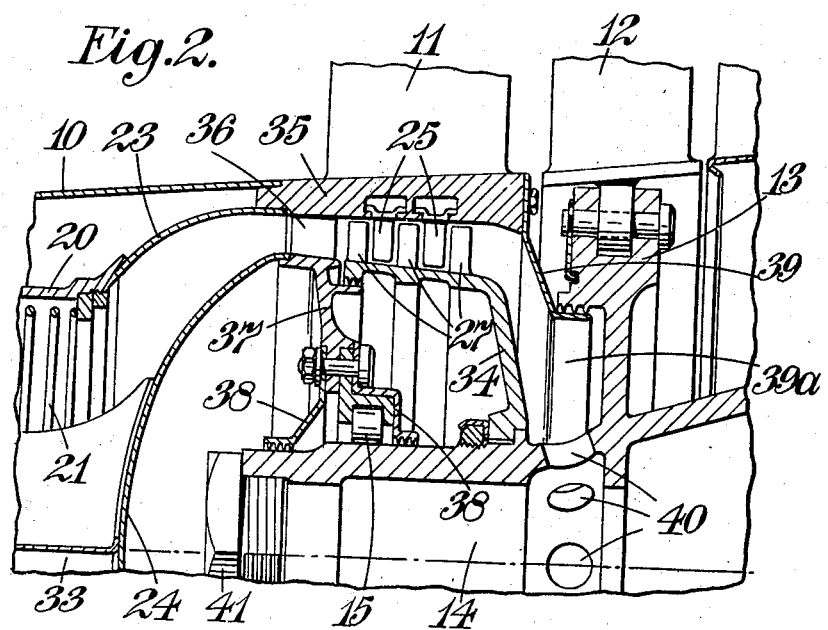
Figure 2 is a view similar to Figure 1 showing a modification.

Turning now to Figure 2, there is illustrated a similar arrangement, but in this arrangement the expansion turbine encircles the stub shaft 14, the turbine rotor blades 27 being carried on a bell-shaped member 34 mounted directly on the stub shaft 14 and the stator blades 25 of the turbine being mounted directly in the outer annular wall 35 of the housing structure for the bearing 15. The bearing housing structure also comprises a number of vanes 36 leading to a diaphragm 37 carrying the bearing 15, oil seal members 38, and the domed member 24.

The outlet from the turbine is afforded between the downstream end of the bell-shaped member 34 and an inwardly-extending annular member 39 carried by the outer annular wall 35 of the bearing housing structure, and the expanded gas or expanded ram-pressurised air flows inwardly from the turbine, which in this case is a three-stage axial flow turbine, to ports 40 formed in the shaft 14. The upstream end of the shaft 14 is closed off by a threaded plug 41. The inwardly-extending member 39 has at its inner periphery an axial flange 39a co-operating with the compressor rotor 13 to form a labyrinth seal to prevent excessive escape of gas from the compressor shaft 14 into the compressor inlet.

As shown in Figure 4 for example, in each of these arrangements, where the pressure gas is derived from a source outside the engine, a suitable control valve 45 will be provided in the pressure gas duct 32 through which the starting pressure gas is supplied and it may be arranged (as shown in Figure 7) that this valve 45 is operable to connect the duct 32 to the pressure gas source for starting purposes, which may comprise a pressure gas cylinder 46, and to an intermediate stage of the compressor of the engine through pipe 47 for providing cooling air to the engine after starting and during flight at low speeds.

In an alternative arrangement shown in Figure 6, the intermediate stage of the compressor may be connected to a space upstream of the expansion turbine, for example the space between wall member 23 and domed member 24; this connection may be made through one or more hollow struts 11, and will incorporate a valve 45 which is operated either manually or automatically to be opened at low flight speeds and closed at high speeds. Provision will be made for closing valve 45 when pressure gas for starting purposes is supplied to duct 32, either by use of the pressure gas or otherwise.

The source of pressure gas may be for example a cylinder 46 containing the gas under high pressure, and it may be fitted with a suitable reducing valve 48. Another alternative is to use the dissociation of hydrogen peroxide to provide the pressure gas.

Where the pressure gas source is carried in the aircraft, it may be permanently connected through the control valve 45 and suitable ducting to duct 32; where an independent source is used, a suitable coupling 49 (Figure 5) will conveniently be provided at the forward end of of duct 32 to which the source may be connected. As shown in Figure 7, the pressure gas source may, in certain cases, be derived from the compressor of another engine of the aircraft through, say, a duct 59.

Figure 3:
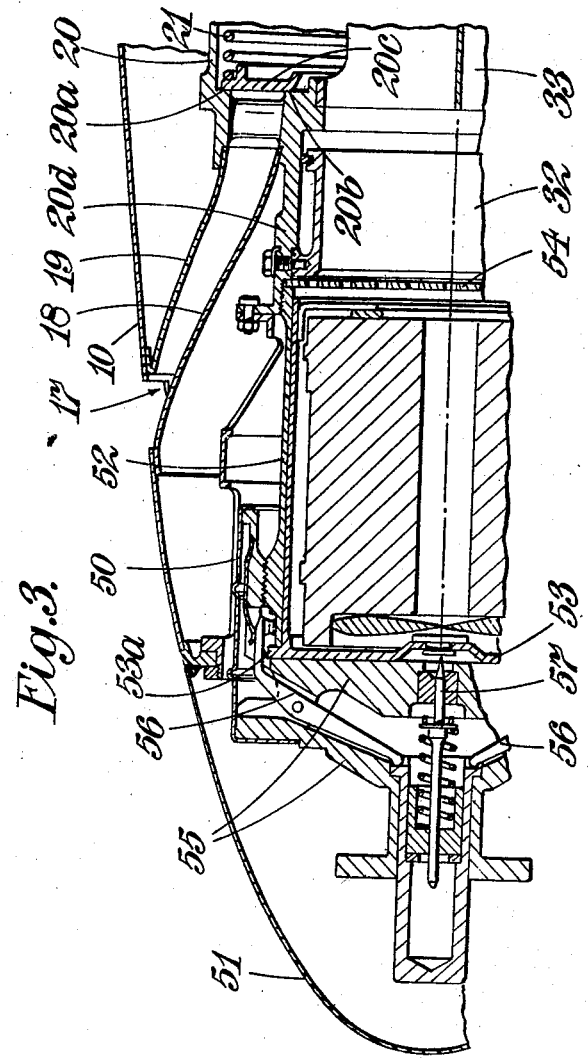
Figure 3 is a view corresponding to Figure 1 showing one suitable form of apparatus for supplying starting pressure gas to the engine.

There is illustrated in Figure 3 one suitable source of pressure gas for operating the expansion turbine for engine starting. In this arrangement a cartridge discharge apparatus 50 of known construction is accommodated within the nose of the bullet fairing 10, and the fairing 10 is provided with a removable or hinged end cap 51 to give access to the apparatus 50.

The apparatus 50 comprises a cylinder barrel 52 for receiving the cartridge 53, the cylinder having its outlet end threaded into an axial extension 20d of the valve structure 20 to be aligned with the supply duct 32 which is carried within the extension 20d. A grid 54 is located between the cylinder 52 and the duct 32 to prevent solid particles being carried by the combustion gases into the engine. The apparatus 50 also comprises a breech cap 55 which is screwed onto the cylinder barrel 52 and is locked to the cylinder by levers 56. The rim 53a of the cartridge is gripped between the cylinder barrel 52 and the breech cap 55. The breech cap 55 also carries the firing pin 57 which is normally actuated electrically.

On discharge of the cartridge 53, the combustion gases pass through the grid 54 into duct 32 and thus are fed to the expansion turbine.

The cartridge discharge apparatus is charged by removing the breech cap 55, which operation automatically withdraws any cartridge within the apparatus, inserting a new cartridge and replacing the cap.

The invention has the advantage that separate mechanism for rotating the engine during starting, such as an electric starter motor or a separate turbine, is not required, and accordingly results in simplification and saving of weight.

I claim:

A gas-turbine engine comprising a main rotor shaft, a compressor drivingly mounted on the rotor shaft, combustion equipment which is connected to receive air compressed in said compressor and in which fuel is burnt in said compressed air, a turbine drivingly mounted on said rotor shaft and connected to receive the products of combustion from the combustion equipment, a further expansion turbine which is coupled to the engine rotor to assist to drive the rotor shaft, an annular inlet structure including an annular passage having its upstream end connected to be supplied with ram pressurized air and having its downstream end connected to deliver to said expansion turbine, an annular valve seating in said annular passage between its upstream and downstream ends, an annular valve member co-operating with said seating, a spring urging the annular valve member in the upstream sense onto said seating, said valve member controlling the flow of ram pressurized air through said annular passage to the expansion turbine, a duct structure coaxially within said annular inlet structure, said duct structure having an upstream end affording a second inlet and a downstream end opening into said annular passage downstream of said valve seating whereby gas flowing in said duct structure is delivered to said expansion turbine, and means for starting the engine and comprising a source of pressure gas connected to deliver pressure gas through the second inlet and said duct structure to the expansion turbine to operate it thereby to drive the engine for starting purposes, said expansion turbine having an outlet therefrom delivering gases cooled by expansion therein to the engine for auxiliary purposes.

References Cited in the file of this patent

UNITED STATES PATENTS

| | | |
|---|---|---|
| 2,457,833 | Redding | Jan. 4, 1949 |
| 2,608,054 | Price | Aug. 26, 1952 |
| 2,671,315 | Rocheville | Mar. 9, 1954 |
| 2,691,274 | Whitney | Oct. 12, 1954 |
| 2,704,645 | Colvin | Mar. 22, 1955 |
| 2,749,023 | Lewis | June 5, 1956 |
| 2,806,351 | Kent et al. | Sept. 17, 1957 |